United States Patent [19]

Müller

[11] Patent Number: 4,688,645

[45] Date of Patent: Aug. 25, 1987

[54] PRESSURE MEDIUM OPERATED IMPACT TOOL

[75] Inventor: Frank Müller, Leinfelden-Echterdingen, Fed. Rep. of Germany

[73] Assignee: Robert Bosch GmbH, Stuttgart, Fed. Rep. of Germany

[21] Appl. No.: 783,754

[22] Filed: Oct. 3, 1985

[30] Foreign Application Priority Data

Jan. 30, 1985 [DE] Fed. Rep. of Germany ....... 3502977

[51] Int. Cl.⁴ ............ B23Q 5/00

[52] U.S. Cl. ............ 173/116; 173/13; 173/15; 227/7; 227/130

[58] Field of Search ............ 173/13, 14, 116, 119, 173/170, 134, 15, 16, 17; 60/542; 227/7, 130

[56] References Cited

U.S. PATENT DOCUMENTS 3,250,334 5/1966 Sussman ............ 173/116

3,603,406 9/1971 Kahn ............ 173/134

3,948,051 4/1976 Marshall ............ 173/116 X

FOREIGN PATENT DOCUMENTS 2250475 4/1974 Fed. Rep. of Germany .

*Primary Examiner*—E. R. Kazenske
*Assistant Examiner*—Willmon Fridie, Jr.
*Attorney, Agent, or Firm*—Michael J. Striker

[57] ABSTRACT

A hand-held impact tool operated by a pressure medium includes a work cylinder, a piston movable in the work cylinder by the pressure medium, and an impact member. A pressure medium container, preferably a $CO_2$-cartridge, is immediately attached to the housing of the tool so that no pressure medium conduit system or electric cable system are required. The force of the spring for driving the impact member is adjustable. The tool is provided with a displaceable hand grip and a releasing handle for releasing the impact member.

14 Claims, 7 Drawing Figures

DETAILED DESCRIPTION OF THE PREFERRED EMBODIMENTS

Referring now to the drawings in detail the impact tool designated in total by reference numeral 1 is substantially assembled of a housing upper portion 2, a pressure medium member 3, a hand grip 4 and a $CO_2$-cartridge or container 5. The housing upper portion 2 includes a work cylinder 6 in which a piston 7 is guided. An impact blade 8 is connected to the piston 7 and this connection is secured by means of a pin 9. An O-ring 10 is inserted into the work cylinder 10 at the end thereof facing a workpiece 84. The impact blade 8 is further guided in a passage 11, 12 of which one is formed in the housing upper portion 2 and the other is formed in a guide element 13. The guide element 13 is a portion of a clip magazine 14 which is inserted into a respective recess of the housing upper portion 2. A threaded bore 15 can receive a bolt 16 which has a pin 17 at the end thereof and is rigidly connected to a ring-shaped knirled head 18. The knirled head 18 is positioned in a cutout 19 of the housing upper portion 2. The pin 17 extends in a cylindrical bore 20 which is in alignment with the threaded bore 15 and is also formed in the housing upper portion 2. Pin 17 can receive the end of a helical spring 21,the other end of which is engaged in a bore 22 of an impact member 23. The impact member itself is guided in the bore 20. The end face of the impact member 23 facing away from the spring 21 is flat. That end face is positioned against an impact pin 24 which is inserted in a bore 25 formed in the pressure medium member 3. Bore 25 is also in alignment with the cylindrical bore 20.

As can be clearly seen in the drawing the end of the impact pin 24 facing the impact member 23 has a collar or flange. The opposite end of the impact pin 24 is in turn rounded. This opposite rounded end lies against a valve pin 26 which is a part of a valve arrangement positioned in a threaded sleeve 27 of the $CO_2$-cartridge 5. Other individual structural components of the valve arrangements are inserted in a bore 28 of the threaded sleeve 27. This valve arrangement, in addition to valve pin 26, includes a sealing washer 29, an inner sleeve 30 with a guide bore 31 for the valve pin 26 and through openings 32 for a pressure medium 33 contained in the storage container or cartridge 5, a sealing ring 34, and a supporting disk or washer 35 for this sealing ring. The sealing of the threaded sleeve 27 relative to the pressure medium member 3 is provided by means of a sealing washer 36. A bore in the supporting washer 35 is so large that the pressure medium can flow therethrough although it surrounds the valve pin 26. The valve pin 26 in turn is provided at its end,facing away from the pin 24, with a flange or collar 37 which lies on the sealing ring 34 or can be raised from the latter. Thus the $CO_2$-cartridge 5 which serves as a pressure medium storage can be closed or opened.

Furthermore, a pressure medium passage 38 provided in the pressure medium member 3 is in communication with the bore of the supporting washer 35 and the work cylinder 6. The pressure medium can flow via this passage 38 from the pressure medium storage 5 into the work cylinder 6. The wall of the cylindrical bore 20, which faces the hand grip 4, has a slot 39 through which a nose or projection 40 of a double-arm lever 41 can engage in the cylindrical bore 20. This nose 40 thereby can lie in front of the end face of the impact member 23, which faces the impact pin 24. The double-arm lever 41 takes this position of the engagement of nose 40 under the action of a compression spring 42 continually acting on lever 41. The double-arm lever 41 is supported in a recess 44 by a pin 43. The opposite end of the lever 41 which faces away from the nose 40 has an oblique surface 45 which can lie against a corresponding oblique surface 46 provided on a releasing handle 47. The releasing handle is also pivotable about a pin 48 in the recess 44 of the hand grip 4. The releasing handle 47 is biased by a spring 49 which is supported at its one end in a bore 50 formed in the hand grip 4 and at the other end in a bore 51 provided in the releasing handle 47. In the vicinity of the knurled ring or head 18, the housing upper portion 2 has an extension 52 projecting downwardly. This extension is positioned opposite to a projection 53 provided on the hand grip 4. Both extension 52 and projection 53 have pocket bores opposing each other and accommodating a helical compression spring 54.

The housing upper portion and the pressure medium member 3 are preferably glued to each other. It is, of course, understood that they can be connected to each other by any other suitable means, such as bolts or the like.

The housing upper portion 2 with the pressure medium member 3 are connected to the hand grip 4 by means of two guide rods 55 as clearly shown in FIG. 4. The guide rods 55 are pressed into the bores formed in the pressure medium member 3. They can, however slide in the bores of the hand grip 4. A guide block 56 (FIG. 4) is positioned laterally of the pressure medium 3 while a guide block 57 is positioned laterally of the housing upper portion 2. These guide blocks 56 and 57 receive two guide pins 58 (shown in FIGS. 4–7) on which a carriage 59 is movably guided along the work cylinder 6. The carriage 59 supports a detent or pawl 60 pivotable about a pin 61 on the carriage (FIG. 6) and provided with a projection or nose 62. Nose 62 can be engaged in a slot 63 formed in the wall of the work cylinder 6. Slot 63 simultaneously serves the purpose of a pressure release opening for the pressure medium which has previously driven the piston 7. Nose 62 can extend through the slot 63 and become engaged in a groove by provided in the piston 7. Nose 62 further has an oblique surface 65 the purpose of which will be explained below.

As further seen in FIGS. 4 through 7 the pawl 60 is biased by a compression spring 66 which is inserted in a bore of pawl 60 and continually urges the pawl into the work cylinder 6. Detent or pawl 60 also has an oblique edge 67 which corresponds to a respective face provided on a hose or projection 68 formed on the housing upper portion 2. The underside of the carriage 59 is formed as a toothed rack 69 (FIG. 4) which is in mesh with a gear 70 which is supported in the housing upper portion 2 by means of a pin 71. A larger gear 72 is in mesh with gear 70. Gear 72 forms with a smaller gear 73 a double gear which is supported in the housing upper portion 2 by means of a pin 74. A rocker lever 76 having a toothed sector 75 is in mesh with the smaller gear 73. The rocker lever 76 is in turn supported on a lug 77 of the housing upper portion 2 by a pin 78. An oblong opening 79 is provided in the elongated arm of the rocker lever 76. A pin 80 secured to a supporting angle 81 is engaged in the oblong opening 79. The supporting angle 81 which is a driver or carrier element is positioned in a recess of the hand grip 4 and is secured thereto by a screw 82. The driven-in clips are desig-

PRESSURE MEDIUM OPERATED IMPACT TOOL

BACKGROUND OF THE INVENTION

The present invention relates to a pressure medium-operated impact tool.

Pressure medium operated impact tools of the type under discussion normally comprise a work cylinder supplied with pressure medium, a piston reciprocally movable in the work cylinder by the pressure medium and an impact blade or impact pin to which the piston imparts impact motions. One of conventional impact tools is disclosed in DE-OS 22 50 475. The operation of this known impact tool depends on the pressure air conduit system. The conduit system of pressure air makes the manipulation of such a hand-held impact tool very difficult. Moreover, various blow forces are impossible due to the existing valve control. The time periods of the working cycles can be influenced by the changes in the release paths of the releasing handle normally provided on such a hand-held impact tool. Furthermore, pressure in the above mentioned pressure air conduit system is relatively low in order to maintain leakage losses as low as possible. This, however, limits possible forces of the blows. The tools impacting strong strikes or blows must be relatively large and heavy because the increase in the force of the blow can be obtained only by the enlargement of the piston surface.

SUMMARY OF THE INVENTION

It is an object of the present invention to provide an improved hand-held impact tool.

It is another object of the invention to provide an impact tool independent from the pressure medium conduit system and capable to operate without any troubles with a single pressure medium conduit.

These and other objects of the invention are attained by a pressure medium-operated impact tool comprising a work cylinder; a piston movable in said cylinder by a pressure medium; an impact blade, said piston driving said impact blade; and a pressure medium storage means.

Due to the provision of the pressure medium storage immediately on the impact tool various possibilities of the application of such a tool can be offered. A high pressure medium storage container can be used whereby the impact tool of small dimensions can be produced. Thereby energy would be substantially saved during the operation of such a tool because leakage losses would be practically eliminated.

The storage container may be removably connected to the tool.

The storage container may contain $CO_2$.

The storage container may be a commercially available $CO_2$-cartridge.

The hand-held tool may further include valve means interconnected between said storage container and said work cylinder; and a movable impact member for applying impacts to the tool; said valve means including an opening valve member which lies within a movement range of said impact member.

The tool may further include a spring continually biasing said impact member.

The tool may include a housing and a hand grip displaceable relative to said housing at right angles to a workpiece; and an engagement element engageable with said impact member to bring the latter to the movement range, said impact member being connected to hand grip by said engagement element for prestressing said spring.

The impact tool may further include an adjusting element connected to said spring for adjusting an impact force of said impact member by adjusting a prestressing of said spring.

The piston may be immediately connected to said impact blade and at the same time form a material mass element for increasing an impact force.

The engagement element may be a double-arm lever pivotally supported on said hand grip.

The impact tool may further include a restoring spring for biasing said displaceable hand grip.

The double-arm lever may be provided with a spring which urges said lever to an engagement position with said impact member, the tool further including a release handle, which is connected to said two-arm lever.

The tool may further include means for mechanical returning of said piston to a ready-to-operation position, said returning means including a carrier element connected to said displaceable hand grip, a pivotable element connected to said carrier element,and transmission means cooperating with said pivotable element and operatively connected to said piston.

The transmission means may be a gear transmission.

The returning means may further include a carriage, two guide pins for guiding said carriage, said transmission means being connected to said carriage to move the carriage on said guide pins, said carriage having a tooth rack cooperating with said transmission means; and a spring-biased pawl supported in said carriage and cooperating with said piston.

The work cylinder has a wall which may be formed with a slot, said pawl being engageable in said slot,said slot also forming a release opening for the pressure medium, said piston having a groove in which said pawl is engageable.

The provision of the control of the pressure-medium-admitting valve is specifically advantageous.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

nated by reference numeral 83 (FIGS. 1–3). FIGS. 1 through 3 illustrate different positions of the impact tool of the present invention.

Figure 1:
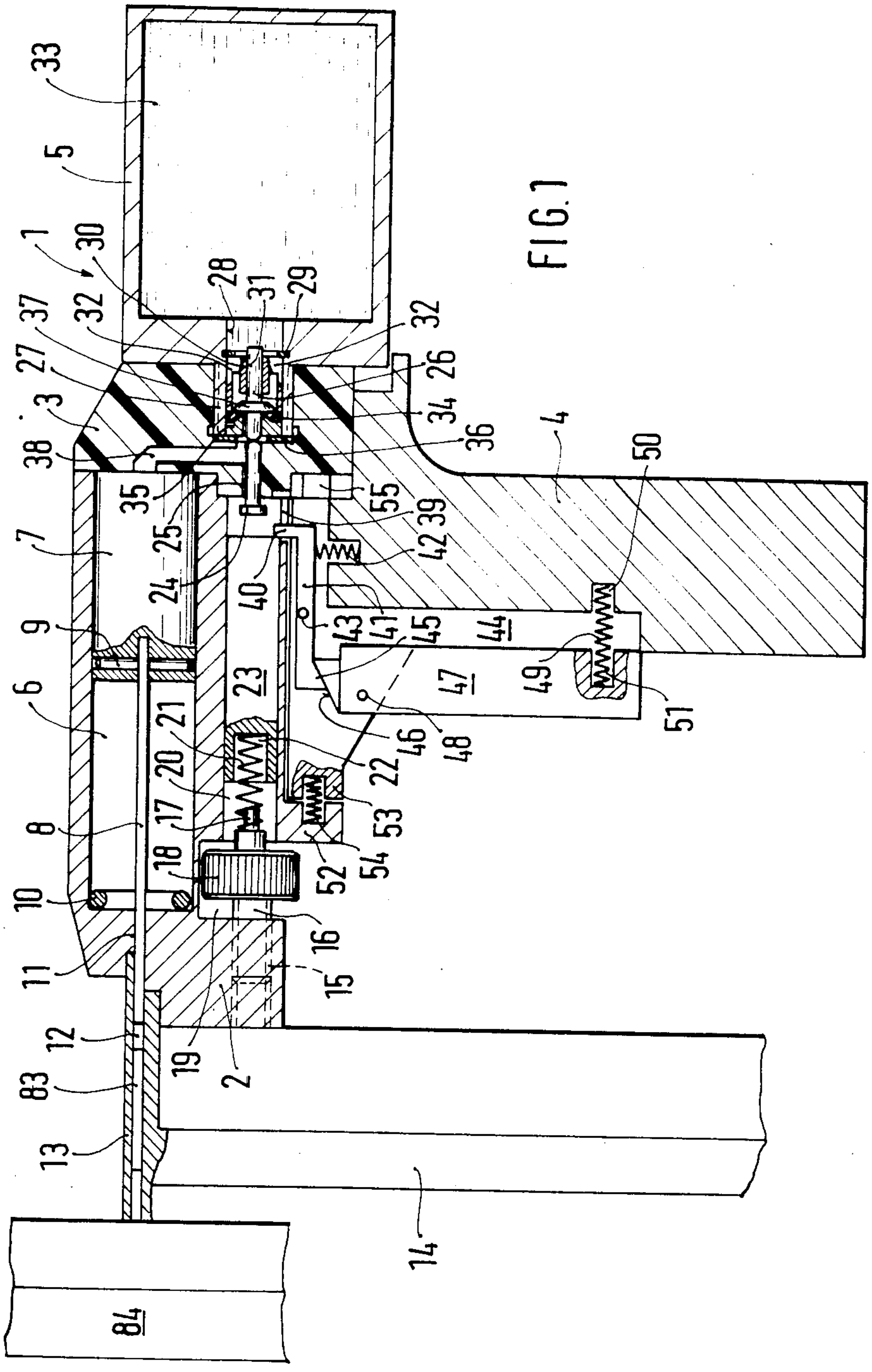
FIG. 1 is an axial cross-section through an impact tool of the invention in the position in which the tool is ready for applying an impact action.

The mode of operation of the impact tool 1 is as follows:

FIG. 1 shows the operational condition in which all the functional parts are prepared for the release of the impact process. The helical spring 21 is prestressed; piston 7 is in its initial position before applying an impact to an impact or percussion blade 8. By the actuation of the releasing handle 47 the double-arm lever 41,due to the cooperation of the oblique surfaces 45 and 46, is pivoted in the clockwise direction and thereby nose 40 releases a free path for the impact member 23. The latter due to the force of the helical spring 21 strikes against the impact pin 24 which thereby moves the valve pin 26 from a closing position to an opening position. The force with which the impact member 23 is driven is adjustable by the adjustment of the bolt 16 with the knurled head 18. Thus the time of opening of the valve with the valve pin 26 is determined. The force of the blow of the piston 7 is also adjustable in the same fashion. The pressure medium 33, namely $CO_2$, flows from the cartridge 5 to the work cylinder 6. The pressure medium drives piston 7 towards the O-ring 10 and causes the separation of the uppermost clip from the magazine 14 and the impact movement of this clip by the impact blade 8.

Figure 2:
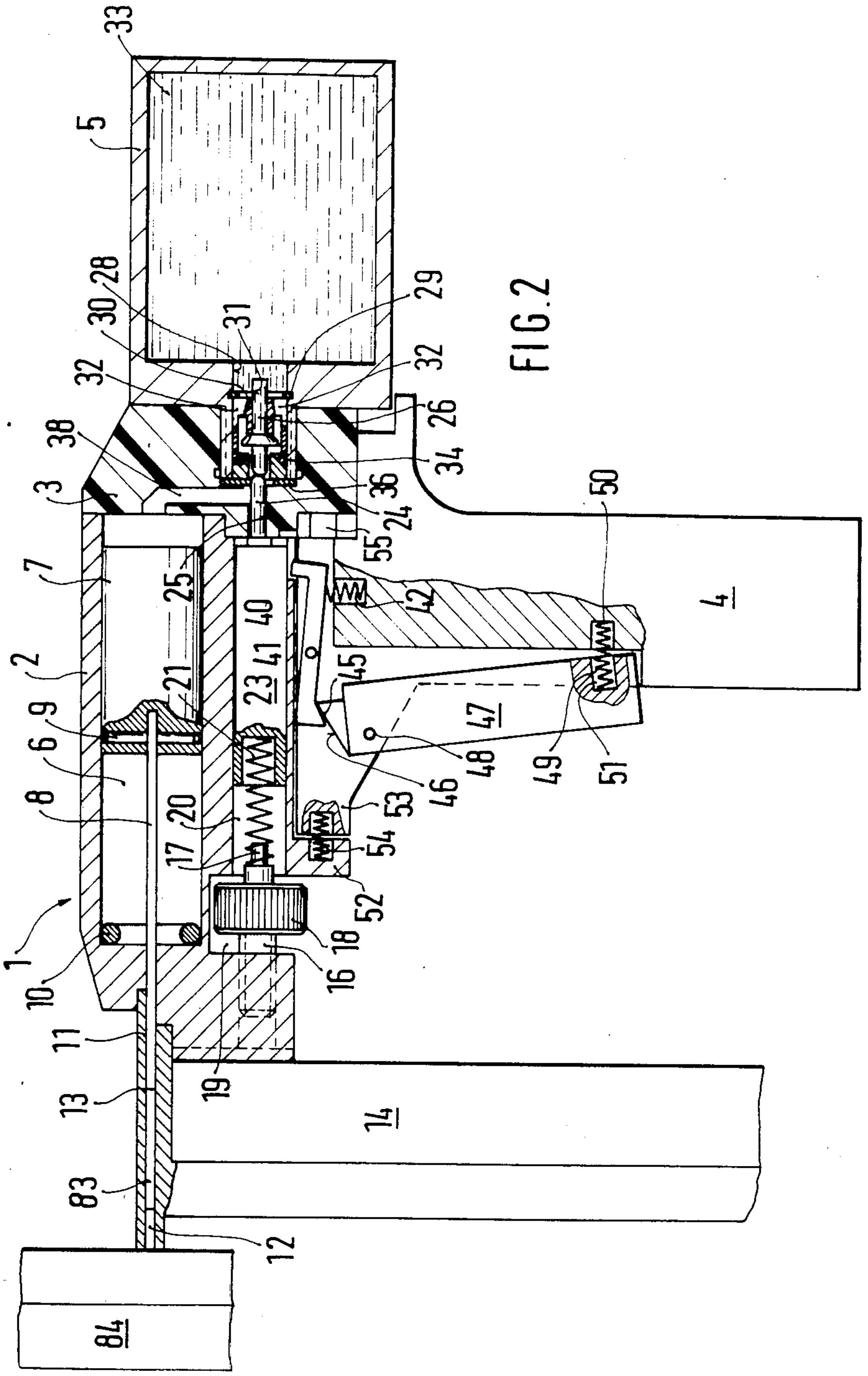
FIG. 2 is an axial cross-section of the tool of FIG. 1 during the impact.
Figure 3:
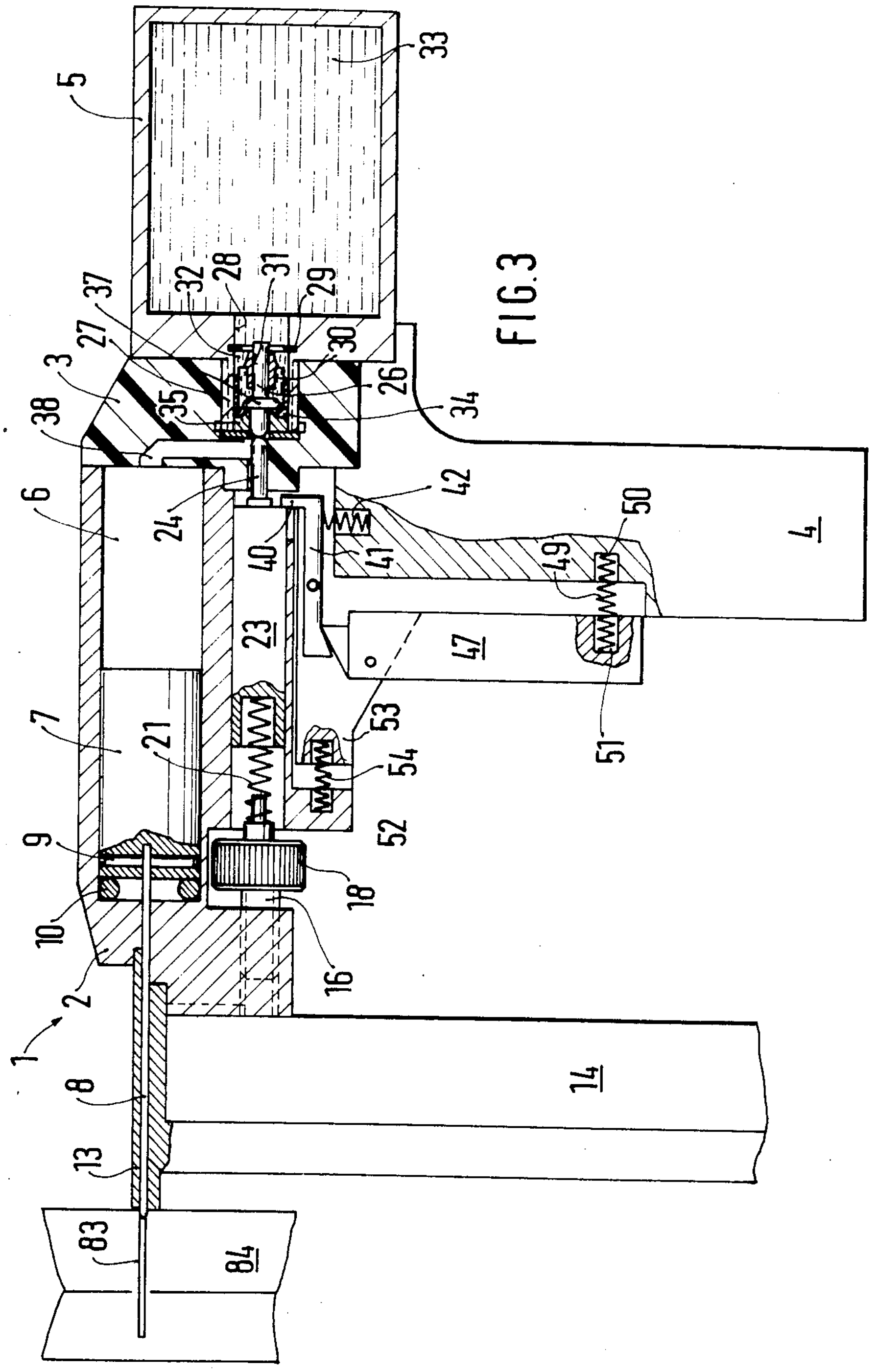
FIG. 3 is an axial cross-section of the tool of FIG. 1 after the impact and shortly before the lifting of a workpiece.
Figure 5:
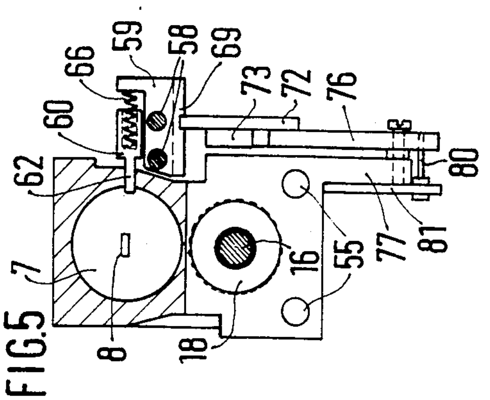
FIG. 5 is a cross-sectional view taken on line V—V of FIG. 4.
Figure 4:
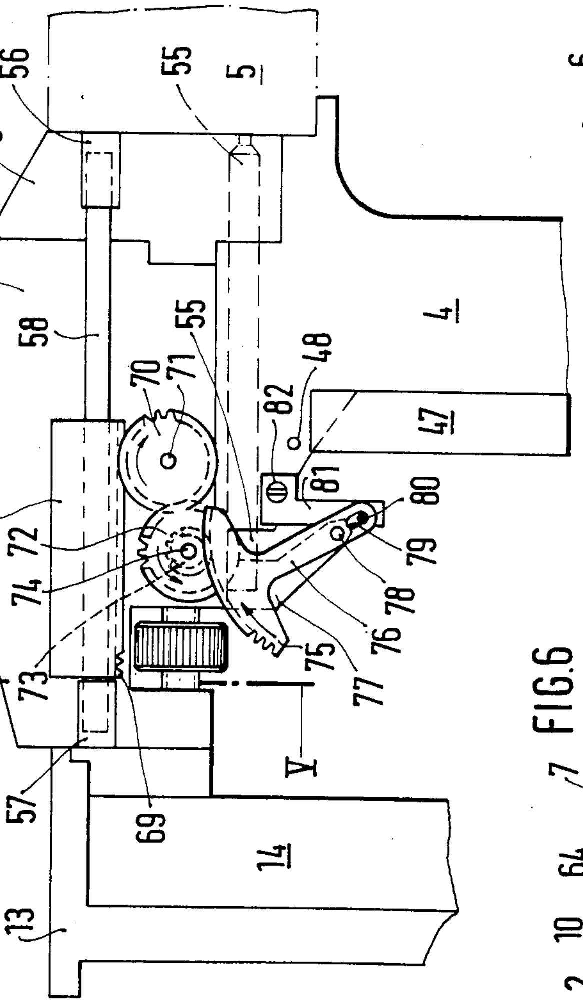
FIG. 4 is a side view of the impact tool with means for a mechanical returning of the piston to its ready-to-operate position.

FIG. 2 shows the process shortly after the beginning of the movement of piston 7 towards the O-ring 10 while FIG. 3 depicts the position of the structural components, in which the impact process ends and the hand grip 4 has been moved so far away from the workpiece 84 that the end face of the guide element 13 abuts against the outer surface of the workpiece 84. The helical compression spring 54 urges and moves the hand grip 4 back to its initial position. Spring 49 brings the releasing handle 44 to its initial position while the compression spring 42 pivots the double-arm lever 41 so that its nose 40 becomes again engaged in the slot 39 of the work cylinder 6. The pressure medium 33 again closes the valve against the force of the helical spring 21 and thus moves the impact element 23 to the position in which nose 40 of the double-arm lever 41 can lie in front of the end face of the impact member 23. Piston 7 lies on the O-ring 10. Clip 83 is driven into the workpiece 84. The impact blade 8 remains in its driven-in position.

Upon the next application of the impact tool to the other spot of the outer surface of the workpiece by means of the hand grip 4,the end face of the guide element 13 is firmly pressed against the outer surface of the workpiece 84. Thereby the hand grip 4 slides on the guide rods 55 against the forces of the helical spring 21 and the helical compression spring 54. The impact member 23 is thus moved by the double-arm lever 41 to its initial position for a new release impact. During this movement the supporting angle 81 rotates the rocker lever 76 in the clockwise direction and the gears 73, 72 and 70 are rotated respectively by the toothed sector 75 to move the toothed rack 69 and thus the carriage 59 away from the workpiece 84. Carriage 59 takes along the piston 7 via detent or pawl 60 and therefore moves the piston to its ready-to-operation position according to FIG. 1. The impact tool 1 is thus prepared for the next impact movement.

Figure 7:
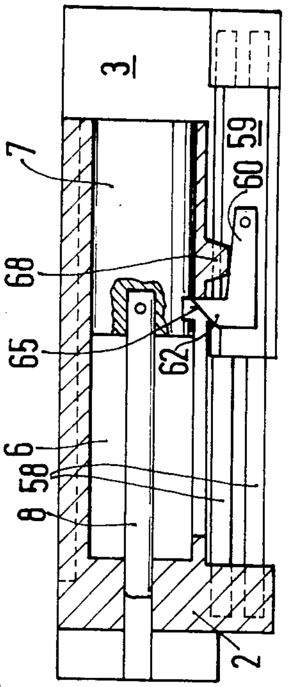
FIG. 7 is a top plan view similar to that of FIG. 6 but at the end of the returning movement of the piston.
Figure 6:
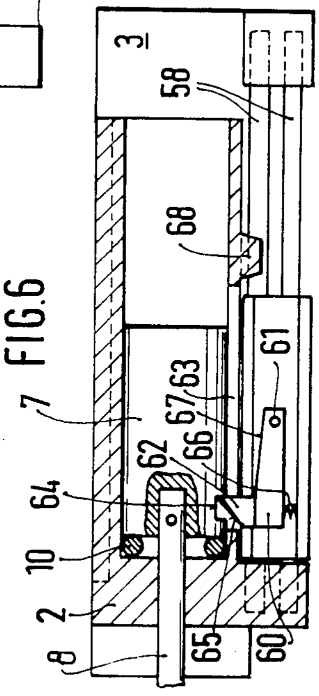
FIG. 6 is a top plan view of FIG. 4, partially in section, at the beginning of the returning movement of the piston.

The movement cycle for the engagement and the returning motion of the piston 7 by the pawl 60 is clearly shown in FIGS. 6 and 7. In the ready-to-operation position nose or projection 68 provided on the housing upper portion 2 and cooperating with the oblique surface of the pawl 60 rotates the latter against the force of the compression spring 66 so far that the nose 62 of the pawl 60 comes out of engagement with the groove 64 in piston 7. Piston 7 can without obstacles be driven forwardly after the release of the handle 47. By lifting the impact tool 1 due to the driving-in of the next clip 43,the hand grip 4 is moved back to its initial position owing to the forces of the springs 21 and 54. This action causes the pivoting motion of the rocker lever 76 in the counter-clockwise direction. Carriage 59 is moved by the gear arrangement 69 to 75 in the direction towards the workpiece 84. Upon this movement, nose 62 of the pawl 60 becomes again engaged in the work cylinder 6 due to the movement of pawl 60 away from the projection 68. Then due to the abutment of the oblique surface 65 against the rear edge of piston 7 nose 62 of pawl 60 is again pressed outwardly and slides along the peripheral surface of piston 7 unless the pawl can again be locked in the groove 64 of piston 7. Thus the engagement connection for the returning movement of piston 7 is again performed during the compression of the impact tool against the workpiece 84. The guide pins 58 ensure an unobjectionable guidance of the carriage 59.

It will be understood that each of the elements described above, or two or more together, may also find a useful application in other types of impact tools differing from the types described above.

While the invention has been illustrated and described as embodied in a an impact tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of generic or specific aspects of this invention.

What is claimed as new and desired to be protected by Letters Patent is set forth in the appended claims.

1. A pressure medium-operated impact tool comprising a work cylinder; a piston movable in said cylinder by a pressure medium; an impact blade, said piston driving said impact blade; pressure medium storage means; valve means interconnected between said storage means and said work cylinder; a movable impact member cooperating with said valve means to open the latter and thus allow the pressure medium to flow into said work cylinder to move said piston, said valve means including an opening valve member which lies within a movement range of said member; a spring continually biasing said impact member; a housing and a hand grip displaceable relative to said housing at right angles to a workpiece; and an engagement element engageable with said impact member to bring the latter to the movement range, said impact member being connected to said hand grip by said engagement element for prestressing said spring.

2. The impact tool as defined in claim 1, wherein said storage means is removably connected to the tool.

3. The impact tool as defined in claim 1, wherein said storage means contains $CO_2$.

4. The impact tool as defined in claim 2, wherein said storage means is a commercially available $CO_2$-cartridge.

5. The impact tool as defined in claim 1, wherein said storage means is a high pressure storage container.

6. The impact tool as defined in claim 1; and further including an adjusting element connected to said spring for adjusting an impact force of said impact member by adjusting a prestressing of said spring.

7. The impact tool as defined in claim 1, wherein said piston is immediately connected to said impact blade and at the same time forms a material mass element for increasing an impact force.

8. The impact tool as defined in claim 1, wherein said engagement element is a double-arm lever pivotally supported on said hand grip.

9. The impact tool as defined in claim 1, further including a restoring spring for biasing said displaceable hand grip.

10. The impact tool as defined in claim 8, wherein said double-arm lever is provided with a spring which urges said lever to an engagement position with said impact member; and further including a release handle, which is connected to said two-arm lever.

11. The impact tool as defined in claim 1; further including means for mechanical returning said piston to a ready-to-operation position, said returning means including a carrier element connected to said displaceable hand grip, a pivotable element connected to said carrier element,and transmission means cooperating with said pivotable element and operatively connected to said piston.

12. The impact tool as defined in claim 11, wherein said transmission means is a gear transmission.

13. The impact tool as defined in claim 11, wherein said returning means further include a carriage, two guide pins for guiding said carriage, said transmission means being connected to said carriage to move the latter on said guide pins, said carriage having a tooth rack cooperating with said transmission means; and a spring-biased pawl supported in said carriage and cooperating with said piston.

14. The impact tool as defined in claim 13, wherein said work cylinder has a wall formed with a slot, said pawl being engageable in said slot, said slot also forming a release opening for the pressure medium, said piston having a groove in which said pawl is engageable.

* * * * *